UNITED STATES PATENT OFFICE.

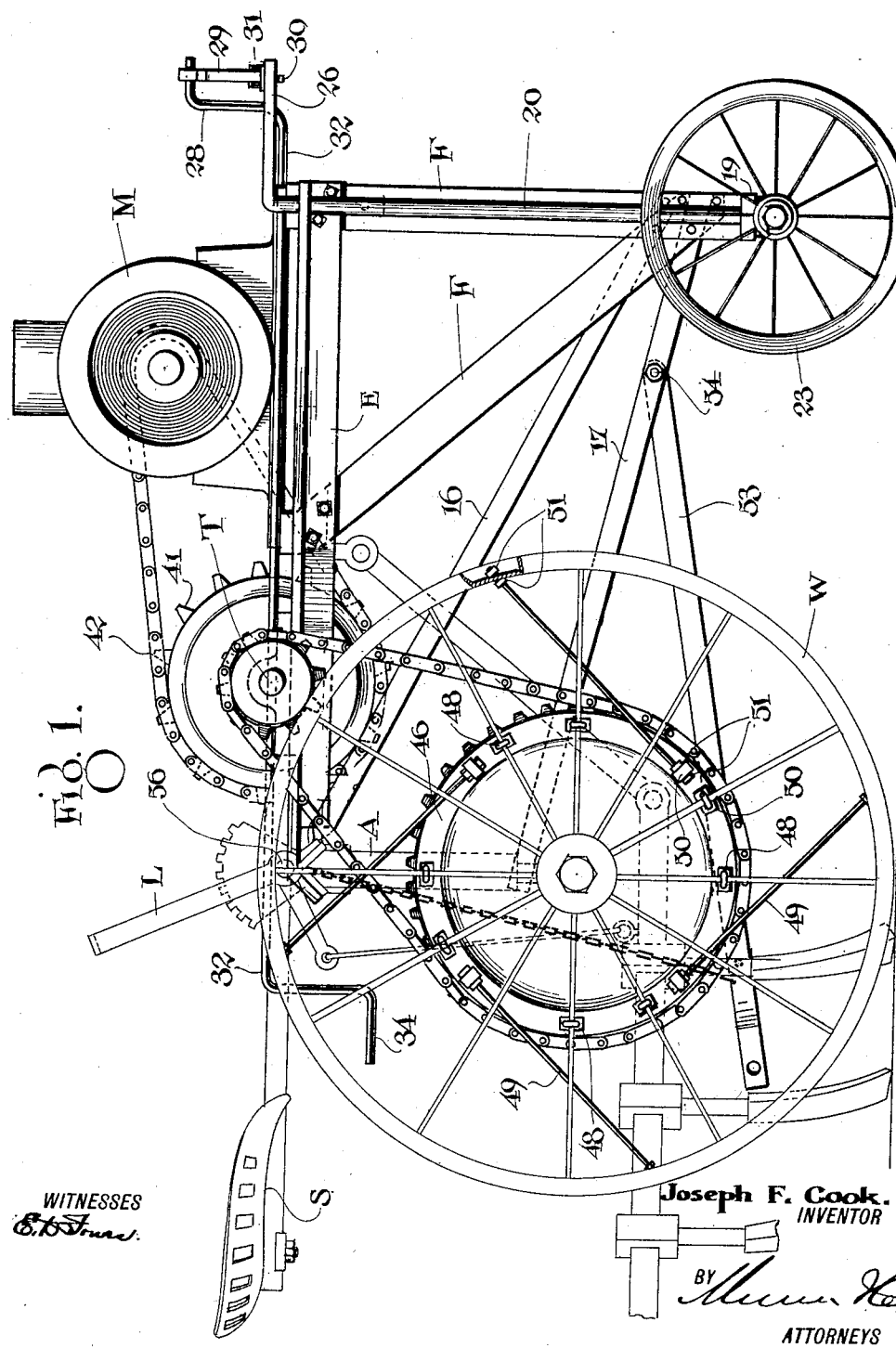

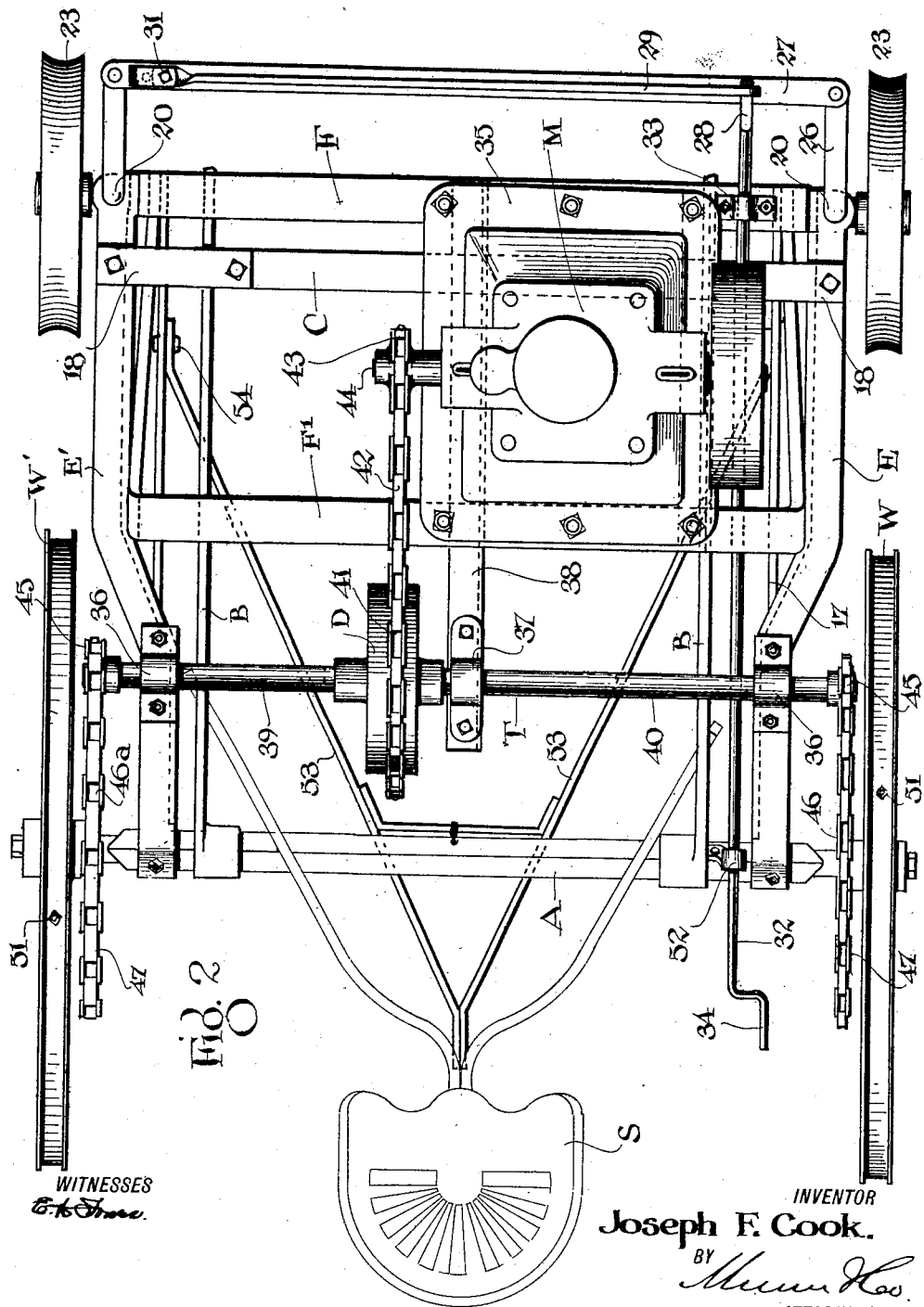

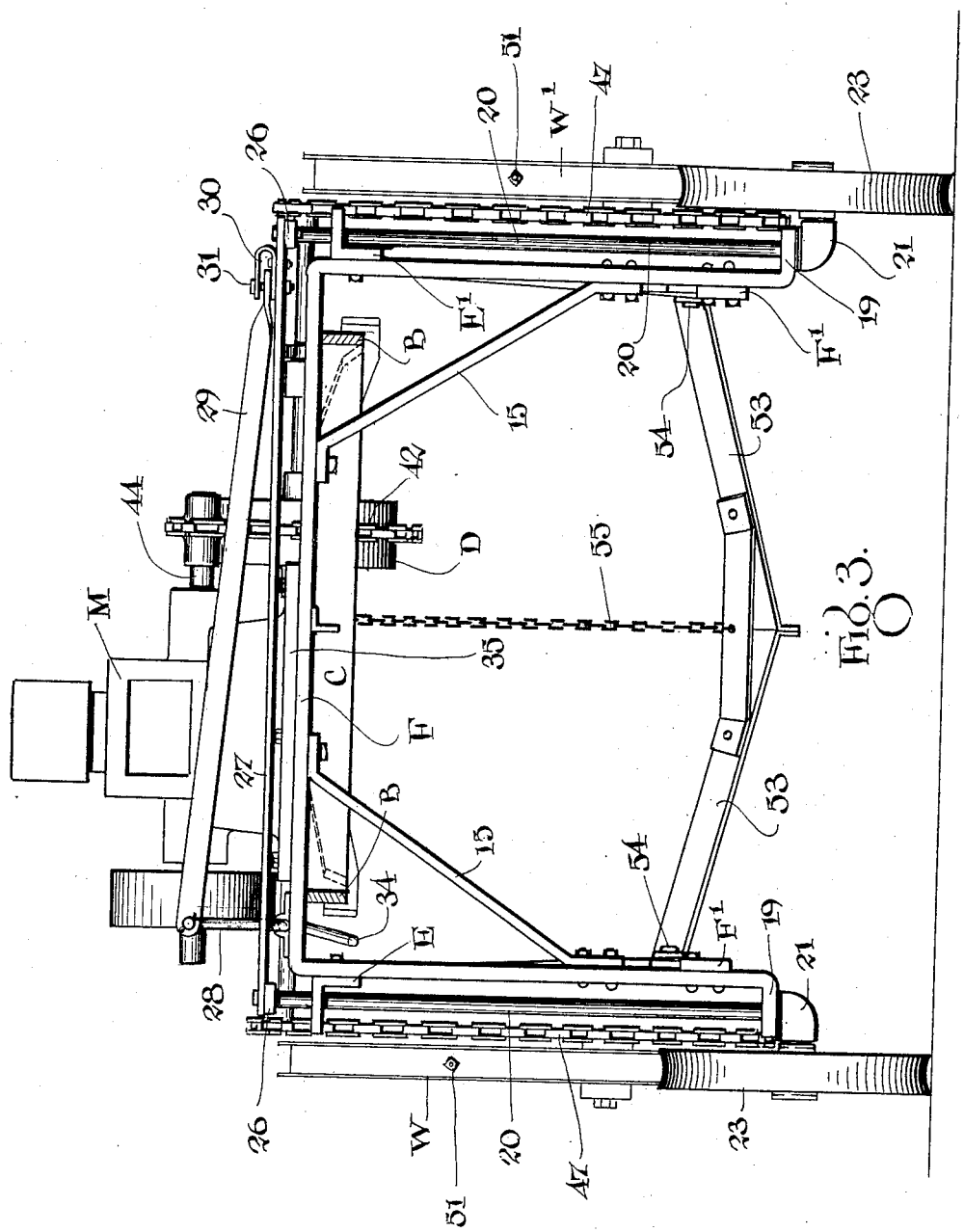

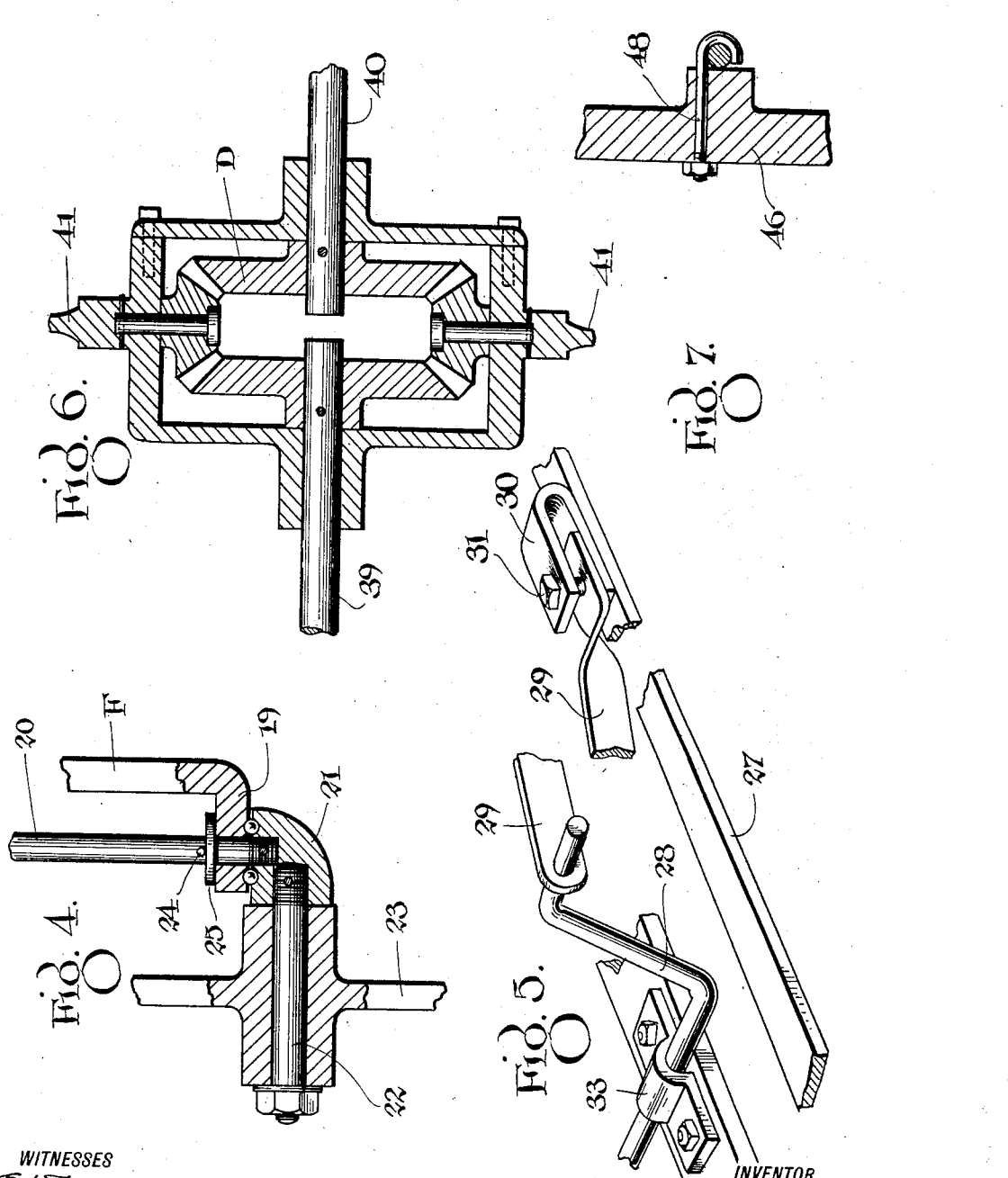

JOSEPH FRAZER COOK, OF SAN FRANCISCO, CALIFORNIA.

ATTACHMENT FOR FARMING IMPLEMENTS.

1,386,456.    Specification of Letters Patent.    Patented Aug. 2, 1921.

Application filed November 10, 1920. Serial No. 423,156.

*To all whom it may concern:*

Be it known that I, JOSEPH FRAZER COOK, a citizen of the United States, and a resident of San Francisco, in the county of San Francisco and State of California, have invented certain new and useful Improvements in Attachments for Farming Implements, of which the following is a specification.

My invention relates generally to farming implements of the wheeled type and particularly to drawn implements of the two-wheeled type.

The purpose of my invention is the provision of a simple, durable and efficient attachment for two-wheeled farming implements which can be applied to any standard form of two-wheeled farming implement by a slight modification of the latter for converting the implement into a self-propelled one or into a tractor which can be utilized for drawing farming implements of any character. Furthermore, my invention provides positive means for driving the wheels of the implement, such means being readily attachable to the implement wheels and constructed to allow for the differentiation in movement of the wheels. My invention also provides simple and efficient steering mechanism for effecting a steering of the implement from the operator's seat.

I will describe one standard form of two-wheeled farming implement and one form of attachment embodying my invention and will then point out the novel features thereof in claims.

In the accompanying drawings:

Figure 1 is a view showing in side elevation one form of two-wheeled farming implement having applied thereto one form of attachment embodying my invention.

Fig. 2 is a top plan view of Fig. 1.

Fig. 3 is a view showing in front elevation the implement and attachment shown in the preceding views.

Fig. 4 is an enlarged fragmentary detailed view, partly in section, showing the connection between one of the steering wheels and one of the steering shafts comprised in the attachment.

Fig. 5 is a fragmentary detailed perspective view of a portion of the steering mechanism comprised in the attachment.

Fig. 6 is a vertical sectional view of the differential comprised in the attachment.

Fig. 7 is a fragmentary sectional view showing one of the hooked bolts and the manner in which it is associated with the sprocket wheel and implement wheel.

Similar reference characters refer to similar parts in each of the several views.

Referring specifically to the drawings, my invention in its present embodiment is shown applied to a cultivator of standard construction, it being understood, however, that the construction of the attachment can by slight modification be applied to various standard forms of two-wheeled farming implements. I have shown only those parts of a standard cultivator which are necessary to a clear understanding of my invention, such parts comprising a U-shaped axle A carrying at its opposite ends wheels W and W' which serve to support the cultivator as a unit for movement over the ground. The frame of the cultivator comprises in part a pair of bars B extending forwardly from the axle A and connected by a wooden beam C. As shown in phantom in Fig. 1, the frame of the cultivator carries a gang of shoes which are supported substantially in trailing relation with respect to the wheels. The frame also carries an operator's seat S which is disposed at the rear of the axle A and at such a point as to permit the operator to actuate a lever L for effecting a lifting and lowering of the shoes.

The attachment forming the subject matter of my invention in the present instance comprises a pair of beams E and E' formed of angle bars and maintained in spaced parallel relation by frames F and F'. The frames F and F' are of substantially U-shaped formation with the horizontal portions of the frame F secured to the forward ends of the beams E and E', while the horizontal portion of the frame F' is secured to the beams intermediate the ends of the latter. As illustrated to advantage in Fig. 1, the parallel portions of the frame F' are extended downwardly and forwardly where they are secured by means of rivets to the parallel portions of the frame F at points adjacent the free ends of the latter. As shown in Fig. 3, the frame F is reinforced by brace bars 15, while the attachment in its entirety is adapted to be rigidly secured in part to a standard cultivator by other brace bars 16 and 17 bolted to and extending rearwardly from the parallel portions of the frame F. Furthermore, metal straps 18 are provided which are secured to the beams E and E' at points adjacent their forward ends, and which are adapted to be secured to the wooden beam C of the cultivator.

As shown in Fig. 3, the free ends of the parallel portions of the frame F are bent laterally to provide extensions 19 which are perforated to rotatably receive steering shafts 20. The upper ends of the steering shafts 20 are rotatably fitted within suitable openings formed in the beams E and E'. As shown in Fig. 4, the lower ends of the steering shafts 20 are screw-threaded to engage a connecting block 21, and screw-threadedly fitted within the same connecting block is a stub axle 22 upon which a steering wheel 23 is journaled. Each steering rod 20 is locked against downward movement within the corresponding beam and extension by means of a pin 24 which is extended through the shaft at a point above the extension 19. This pin 24 engages a ring 25 fitted on the shaft and overlying the extension 19. Ball bearings are interposed between the connecting block 21 and the extension 19 so as to reduce the friction between these elements as much as possible.

As shown in Figs. 1, 2 and 3, the upper ends of the steering shafts 20 are formed with right angularly disposed arms 26, the free ends of which are pivotally connected to a connecting rod 27. The connecting rod 27 is in turn operatively connected to a crank 28 through the medium of a link 29 and a yoke 30 through which extends a pin 31. As illustrated to advantage in Fig. 5, the yoke 30 is bolted to the connecting rod 27 at a point adjacent one end thereof, while the link 29 is connected to the pin 31 at a point between the parallel portions of the yoke. The crank 28 is formed on the forward end of a steering rod 32 which is journaled in a bearing 33 carried by the horizontal portion of the frame F. The rear end of the steering rod 32 is provided with a crank handle 34 that is adapted to be gripped in effecting rotation of the steering rod to actuate the crank 28.

From the foregoing arrangement it will be seen that a steering of the wheels 23 can be readily effected by a manipulation of the steering rod 32 through the medium of the crank handle 34. When the steering rod is rotated in one direction or the other, the crank 28 is rotated to effect a longitudinal movement of the connecting rod 27 through the medium of the link 29. This movement of the connecting rod 27 in turn effects a simultaneous rotation of the steering shafts 20, and as the latter are operatively connected to the stub axles 22, it will be clear that the steering wheels 23 can be bodily rotated in either direction about the steering shafts as a center.

Bolted to and spanning the space between the horizontal portions of the frames F and F' is a base frame 35 of rectangular formation, upon which is suitably secured a gasolene motor designated at M. The motor M is adapted to effect a driving of any implement to which the attachment is applied through the medium of a driving shaft T journaled in bearings 36 carried by the beams E and E' and a third bearing 37 carried by the rear end of a bar 38. The bar 38 is secured to the parallel portion of the frames F and F' in the manner shown. The shaft S is made up of two sections 39 and 40 which are operatively connected to each other by a differential gearing of standard form designated at D. The construction of the differential is clearly shown in Fig. 6 wherein it will be seen that the casing of the differential carries the usual sprocket 41 and about which is trained an endless chain 42. The chain 42 is also trained about a smaller sprocket 43 fixed to the engine shaft 44. The opposite ends of the shaft T carry sprocket wheels 45 which are operatively connected to driving sprockets 46 and 46ª through the medium of endless chains 47. The driving sprockets 46 and 46ª are adapted to be fixedly secured to the wheels W and W' of the cultivator so as to transmit power from the motor M to the wheels W and W' for effecting a propulsion of the implement. In the present instance, I employ a plurality of bolts 48 which are extended through and secured in the driving sprockets at points adjacent their periphery. These bolts 48 are formed with hooked ends which are adapted to embrace the spokes of the wheels W and W' so that the latter are caused to move with the driving sprockets when the sprockets are rotated. To prevent excess torsional strain upon the spokes of the wheels W and W' and to provide further securing means for the driving sprockets, I provide rods 49 arranged to rigidly connect the peripheries of the driving sprockets to the peripheries of the driving wheels W and W'. As illustrated to advantage in Fig. 1, the inner ends of the several rods 49 are secured to and extend through collars 50 secured to the outer sides of the driving sprockets. The outer ends of the several rods extend through suitable openings formed in the rim of the wheels W and W'. The opposite ends of each rod 49 are secured to the corresponding collar and the rim of the wheel W or W' by nuts 51 threadedly fitted upon the rods and arranged to embrace the collar and rim in the manner shown in Fig. 1. With the several rods secured in this manner, it will be clear that because of their tangential arrangement with respect to the driving sprockets, they utilize the rims of the wheels to prevent relative movement of the driving sprockets with respect to the wheels, at the same time precluding any tendency of the hooked bolts from bending or distorting the spokes of the wheels.

In the applied position of the attachment to the cultivator as shown in Figs. 1, 2 and 3, the several brace bars as well as the rear ends of the beams E and E' are secured to the axle A, it being understood that before the attachment can be applied to the cultivator it is necesary to cut off or remove the forward portion of the cultivator frame. By reference to Fig. 2 it will be seen that the forward ends of the bars B are broken off, it being understood that as the cultivator is originally constructed these bars are extended and connected together at their forward ends to provide the usual tongue to which drafting means is secured. With the brace bars and beams secured to the axle as just described, it will be clear that the frames F and F' are rigidly supported in the position shown so that the steering wheels 23 are arranged in advance of the wheels W and W'. As the wheels 23 are capable of being steered through the mechanism previously described, it will be clear that the cultivator is now converted into a four-wheeled implement which is capable of being steered.

The driving means for the cultivator can be easily connected by the application of the hooked bolts 48 and the rods 49 in the manner shown in Fig. 1 so that with the driving sprockets rigidly secured to the wheels W and W' propulsion of the latter wheels is now made possible through the medium of the motor M, it being understood the differential D allows for any differentiation in movement of the wheels W and W'. The steering rod 32 when in applied position upon the cultivator is further journaled in a second bearing 52 secured to the axle A shown in Fig. 2 so that the crank handle 34 is disposed within easy reach of the operator occupying the seat S.

In order to permit of the combined cultivator and attachment being utilized as a tractor for hauling farming implements of various characters, I provide a draft beam 53 which is of substantial V-shaped formation as shown in Fig. 2, its forward ends being pivotally connected to the brace bar 17 at points indicated at 54. It is to be particularly noted that the pivotal connection 54 is in advance of the wheels W and W' so that when the draft beam is connected to a farming implement, the weight of such implement as it is drawn along by the tractor tends to force the tractor downwardly at its forward end which as a natural consequence prevents tilting or lifting of the tractor. The draft beam 53 can be lowered into working position or elevated when not in use by a chain 55 which is wound on or unwound from a shaft 56 by rocking the lever L, the latter being fixed to the shaft.

In the construction of the attachment as shown in Fig. 2, it will be manifest that an operator occupying the seat S will have a clear view of the ground beneath and in advance of the shoes of the cultivator so that the cultivator can be accurately steered along the rows of crops.

Although I have herein shown and described only one form of farming implement and one form of attachment embodying my invention, it is to be understood that the attachment can be applied to implements of different construction, and that the construction of the attachment can be varied and modified without departing from the spirit of the invention and the spirit and scope of the appended claims.

What I claim is:

1. An attachment for wheeled farming implements comprising, a frame, beams secured to the frame, a second frame secured to the first frame and said beams, an engine supporting base supported upon and secured to both of said frames, wheels carried by the first frame, and means carried by said beams and the first frame for steering said wheels.

2. An attachment for wheeled farming implements comprising, a frame, beams secured to the frame, a second frame secured to the first frame and said beams, an engine supporting base supported upon and secured to both of said frames, steering shafts journaled in said beams and the first frame, wheels carried by the lower ends of said steering shafts, cranks carried by the upper ends of the steering shafts, a manually operable steering rod, and means connecting said rod and said cranks for effecting simultaneous rotation of said steering shafts to effect a corresponding movement of said wheels.

3. An attachment for wheeled farming implements comprising, a frame, beams secured to the frame, a second frame secured to the first frame and said beams, an engine supporting base supported upon and secured to both of said frames, steering shafts journaled in said beams and the first frame, stub axles connecting the lower ends of said steering shafts, wheels journaled on said stub axles, cranks formed on the upper ends of the steering shafts, a rod connecting said cranks, a manually operable steering rod, a crank formed on the end of said steering rod, and a link pivotally connected to the steering rod crank and to said connecting rod.

4. An attachment for wheeled farming implements comprising, a frame, beams secured to the frame, a second frame secured to the first frame and to said beams, a base frame supported upon and secured to both of said frames, wheels supported upon the first frame, steering mechanism for moving said wheels, a base frame secured to and supported on said frames, an engine fixed to said base frame, a sectional shaft journaled on said beams, means operatively connecting said engine with said shaft to effect a differential movement of the shaft sections, sprocket wheels operatively connected to said shaft, and securing means adapted to secure said sprockets to the wheels of a farming implement.

5. In combination, a two-wheeled farming implement including an axle, and an attachment comprising, a frame at the forward end of the implement, beams secured to said frame and to said axle, a second frame secured to the first frame and to said beams at a point in the rear of the first frame, steering wheels carried by the first frame, steering mechanism for said wheels carried by the first frame and said beams, an engine supported on said frames, a sectional shaft journaled on said beams, means for operatively connecting said engine with said shaft to effect a differential movement of the shaft sections, sprocket wheels operatively connected to said shaft, and means detachably securing said sprocket wheels to the wheels of said implement.

6. In combination, a two-wheeled farming implement including an axle, and an attachment comprising, a frame at the forward end of the implement, beams secured to said frame and to said axle, a second frame secured to the first frame and to said beams at a point in the rear of the first frame, steering wheels carried by the first frame, steering mechanism for said wheels carried by the first frame and said beams, an engine supported on said frames, a sectional shaft journaled on said beams, means for operatively connecting said engine with said shaft to effect a differential movement of the shaft sections, sprocket wheels operatively connected to said shaft, and means detachably securing said sprocket wheels to the wheels of said implement, said means comprising hooked bolts extending through the sprocket wheels and embracing the spokes of the implement wheels, and rods secured to and extending tangentially from the sprocket wheels and having their outer ends secured to the periphery of the implement wheels.

7. An attachment for wheeled farming implements comprising, a U-shaped frame, angle beams secured to the parallel portions of the frame, a second U-shaped frame extending diagonally from said beams to the first frame and secured thereto, steering shafts journaled in the beams and in the first frame, stub axles secured to the lower ends of the steering shafts, wheels carried by the stub shafts, cranks formed on the upper ends of the steering shafts, a connecting rod connecting said cranks, a manually operable steering rod journaled on the first frame, a crank formed on one end of the rod, a link pivotally connected to said crank and to said connecting rod, a base frame secured to and supported on said frames, an engine supported on the base frame, a sectional shaft journaled on said beams, means operatively connecting said shaft and engine for effecting a differential driving of the shaft sections, driving sprockets operatively connected to the shaft sections, and securing means adapted to secure said sprockets to the wheels of a farming implement.

8. In combination, a wheeled farming implement including an axle, and an attachment therefor comprising, a pair of beams secured at their rear ends to said axle, a frame secured to and connecting the forward ends of said beams, a second frame secured to said beams intermediate their ends and to the lower ends of the first frame, brace bars connecting the first frame to the axle of the implement, a draw bar pivotally connected to certain of the brace bars at a point in advance of said axle, steering wheels carried by the first frame, steering mechanism carried by the first frame and said beams, a motor supported upon the first frames, a driving shaft journaled on the beams, means for operatively connecting the engine of the driving shaft, and means for operatively connecting the driving shaft to the wheels of said implement.

JOSEPH FRAZER COOK.